United States Patent [19]
Hahto

[11] 3,892,295
[45] July 1, 1975

[54] BOUNDARY-RESPONSIVE WHEEL LOCK FOR A WHEELED VEHICLE

[76] Inventor: Charles Hahto, 1755 N. Berendo St., Los Angeles, Calif. 90027

[22] Filed: Apr. 24, 1974

[21] Appl. No.: 463,572

[52] U.S. Cl. .................. 188/111; 188/69; 188/1 D; 188/167; 280/33.99 C
[51] Int. Cl. .............................................. B60t 7/18
[58] Field of Search ......... 188/110, 111, 69, 31, 29, 188/1 D, 167; 280/33.99 C

[56] References Cited
UNITED STATES PATENTS

| | | | |
|---|---|---|---|
| 3,029,905 | 4/1962 | Nowak | 188/111 |
| 3,090,470 | 5/1963 | Abrams | 188/110 |
| 3,366,201 | 1/1968 | Pesta | 188/110 |
| 3,608,693 | 9/1971 | Stosberg et al. | 280/33.99 C |

FOREIGN PATENTS OR APPLICATIONS

| | | | |
|---|---|---|---|
| 1,360,334 | 3/1964 | France | 188/69 |
| 432,693 | 3/1925 | Germany | 188/111 |

Primary Examiner—Duane E. Reger
Assistant Examiner—Edward R. Kazenske

[57] ABSTRACT

A boundary-responsive wheel lock for a wheeled vehicle such as a shopping cart, or the like, which is rollably supported by multiple wheels, with one or more of the wheels being provided with the boundary-responsive wheel lock which comprises a housing movably mounting a small actuating wheel effectively connected by actuating linkage mechanism to a brake apparatus normally operative to effectively maintain a main vehicle wheel in unlocked relationship whenever the small actuating wheel is maintained in an upper position by contact with an underlying supporting surface which also supports the main vehicle wheel, but arranged to effectively actuate the brake apparatus so as to cause the effective locking of the main vehicle wheel (or wheel and support app.) whenever the small actuating wheel is allowed to move downwardly below the lower periphery of the main vehicle wheel, such as by encountering a boundary taking the form of an actuating groove, thus effectively locking at least that vehicle wheel (or wheel and support app.) against further movement. In a preferred form, the locking of the effective brake apparatus is maintained by latching apparatus until released by an authorized person resetting the apparatus in unlocked relationship (usually by the use of a resetting key).

8 Claims, 11 Drawing Figures

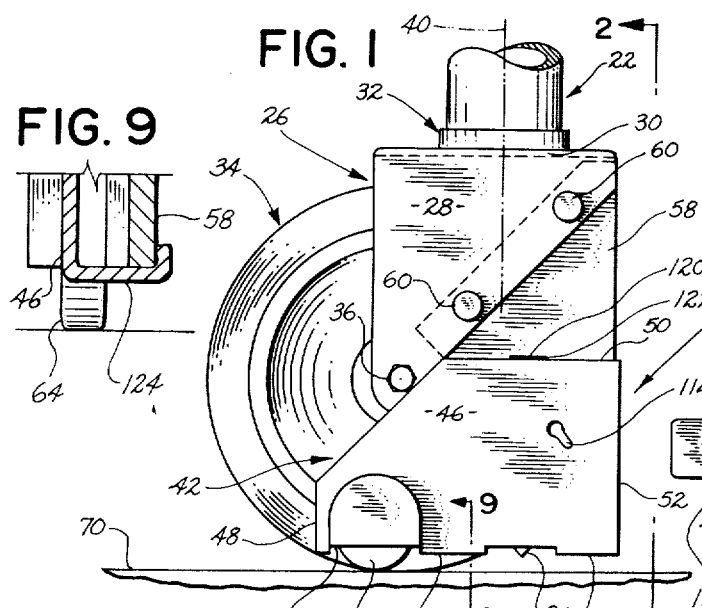
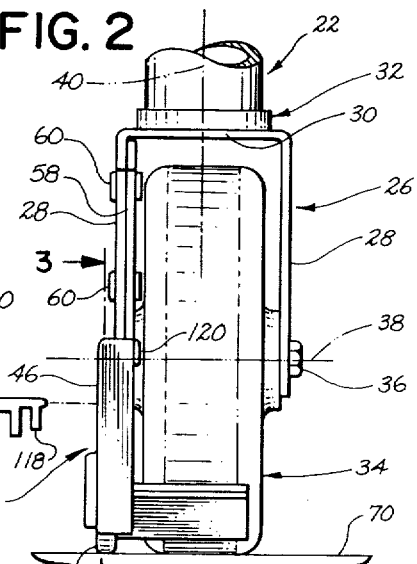
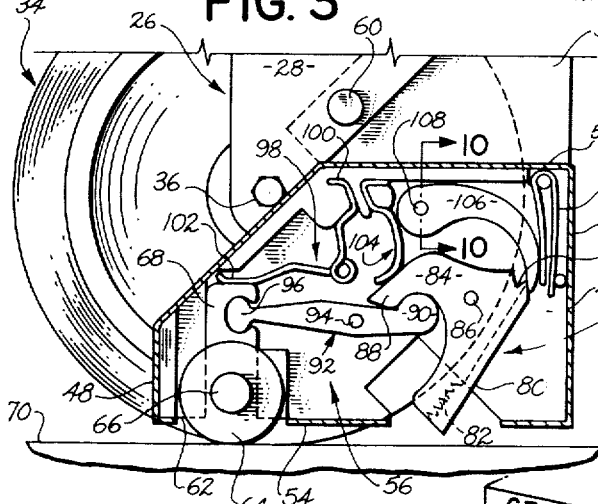
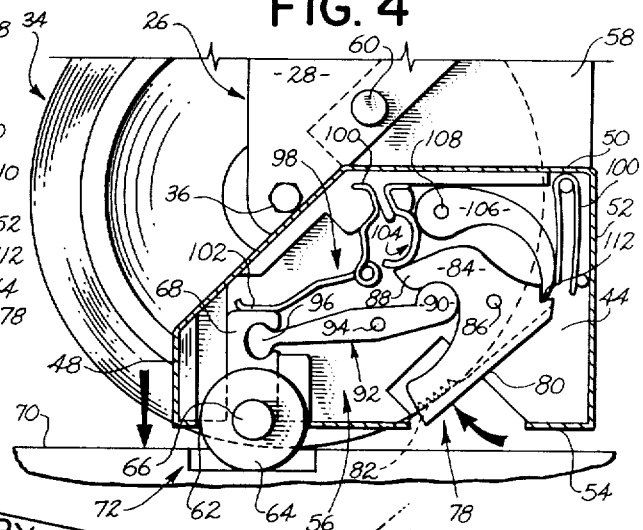
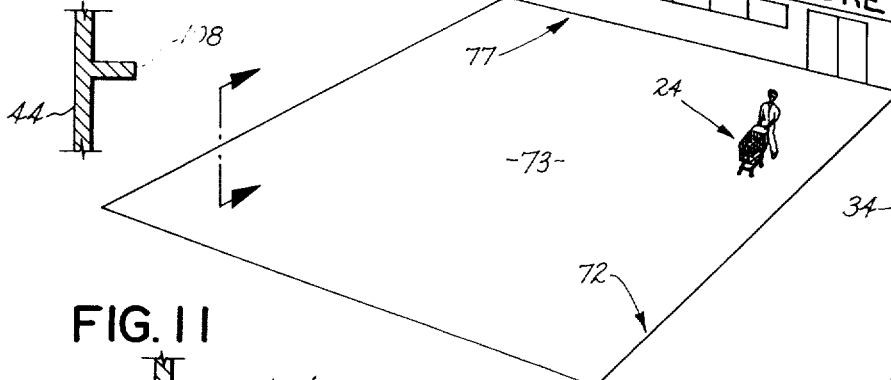
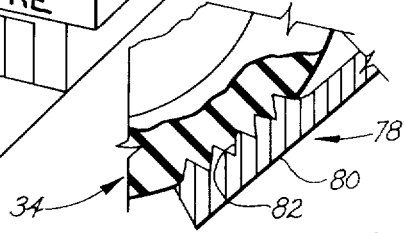
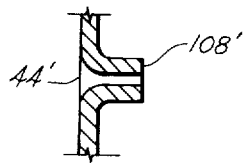
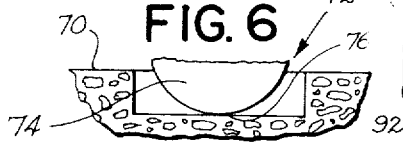
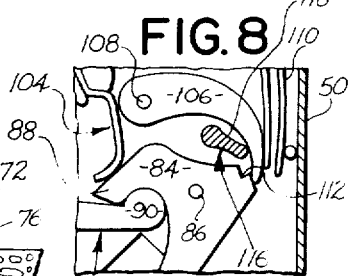

BOUNDARY-RESPONSIVE WHEEL LOCK FOR A WHEELED VEHICLE

BACKGROUND OF THE INVENTION

The field of the invention is generallly that of wheel-locking apparatus for locking one or more wheels of a wheeled vehicle in response to the existence of at least one predetermined condition. One particular aspect of this general field is that of market shopping carts, which are usually provided for the convenience of shoppers so that relatively large loads of groceries, or other purchased items, can be readily wheeled to the person's motor vehicle, which is usually parked in the closely adjacent market parking area. It is not intended that the cart should be taken out of the market parking area or should fail to be left within a predetermined distance of the market for easy retrieval by the market personnel. However, what has happened in prior art practice is that many persons wheel such a shopping cart completely out of the market parking area and far enough away so that the cart may be lost permanently or may be stolen, perhaps by persons other than the shopper who left it at a remote location. In any event, there are far too many such market shopping carts which are lost, and this adds unnecessary cost to the operation of the market since such carts are quite costly. Markets have attempted to solve this problem by posting warning signs that it is illegal to remove the cart from the permissible area immediately around the market and usually within the market parking area. This procedure has been relatively unsuccessful since shoppers have merely ignored the warning signs in many cases. A second prior art attempt to at least partially solve this problem has been to employ shopping cart retrieval personnel, who usually drive up and down all of the various streets in the vicinity of the market looking for abandoned shopping carts located some distance away from the market and who then retrieve them and return them to the market. This has been only partially successful and has added considerable expense since the retrieval personnel have to devote a considerable period of time to this task and must, of course, be paid for same. Other prior art efforts to solve this problem have involved the provision of various kinds of apparatus on the cart and, in some cases, cooperating with apparatus located at a central station within the market, intended to prevent any shopping cart from being rolled away beyond a certain predetermined boundary or limit. Some of these have been based upon distance as the controlling factor — that is, the shopping cart is in some manner provided with apparatus responsive to the cart being rolled away to a predetermined distance from the market, at which time some means is either caused to lock one or more wheels of the cart or to operate an alarm signal of one type or another, either at the cart itself, usually causing the person to cease moving it any further, or within the market itself to warn market personnel that the cart is being taken beyond the predetermined maximum limit.

In some cases, the distance-sensing mechanism is similar to an odometer, which is set to activate wheel-locking brakes or an alarm after the cart has been rolled a predetermined distance from the check-out center, with it being effectively re-set each time it is returned. In other cases, the distance-sensing means may actually comprise an electronic distance-measuring device measuring the actual distance from a central station at the market and also arranged to activate either brakes, or an alarm, or both, when a predetermined distance is reached. However, both of these prior art wheel-locking apparatuses have had major disadvantages of one kind or another arising from initial high cost, high cost of maintenance, the non-fail-safe or non-foolproof nature of the apparatus, causing false operation of the brake or alarm apparatus when not called for, and the like. Therefore, it is obvious that a relatively inexpensive, simple, easy-to-install and easy-to-maintain and relatively foolproof type of apparatus intended for this purpose would be desirable, and it is precisely for these purposes that the present invention was developed, since it provides a boundary-responsive wheel lock or wheel-locking apparatus for a wheeled vehicle, such as a shopping cart of the type referred to, which is of a very simple, foolproof type and which will be operated whenever a predetermined boundary is crossed by the shopping cart and will cause the wheel-locking apparatus to remain locked then until authorized market personnal unlock it and re-set the apparatus. These advantages flow from and occur by reason of the specific features of the invention pointed out hereinafter.

SUMMARY OF THE INVENTION

Generally speaking, the boundary-responsive wheel lock, or wheel-locking apparatus, for a wheeled vehicle (usually a shopping cart) of the present invention includes wheel lock housing means provided with means for readily and easily fastening said housing means to a conventional yoke-type wheel bracket conventionally carried by a leg of a wheeled vehicle, such as a shopping cart, so that the entire device may be initially provided on the shopping cart at the time of manufacture or may be subsequently easily added and attached thereto subsequent to the original manufacture of the shopping cart. This makes it possible to purchase shopping carts already incorporating the novel boundary-responsive wheel-locking apparatus of the present invention or to merely buy the boundary-responsive wheel-locking apparatus of the present invention separate and distinct from pre-existing market shopping carts and to add and attach the wheel-locking apparatus to shopping cart wheel brackets of such pre-existing shopping carts with a minimum of effort.

Also generally speaking, the housing means is provided with a movably mounted (usually vertically slidably mounted) small actuating wheel which is connected to actuating linkage means positioned substantially within the housing means and effectively connected at the other or output end with respect to brake means in a manner such that extending movement (usually downwardly extending movement) of the small actuating wheel will cause the output end of said actuating linkage means to effectively move the brake means from a normally disengaged wheel-unlocking relationship into engagement with a portion of a main vehicle wheel in what might be termed a wheel-locking relationship with respect thereto. The small actuating wheel and/or the actuating linkage means are effectively provided with first biasing means (usually biasing spring means) effectively exerting a wheel-extending biasing force relative to said small actuating wheel so that whenever relief or clearance space is provided which extends effectively below the normally horizontally aligned peripheral portion of a main vehicle wheel whereby to allow the small actuating wheel to be downwardly extended by said first biasing means below the level of the corresponding portion of the main wheel, this will occur and will effectively operate said actuating linkage means in a manner causing the output end thereof to forcibly actuate said brake means from a normal wheel-unlocking position into said wheel-locking relationship. The brake means is provided with second biasing means normally biasing the brake means into said wheel-unlocking relationship but exerting a lesser force on said brake means than that effectively exerted thereon by the output end of said actuating linkage means in the opposite main wheel-locking direction whenever said small actuating wheel means is actuated by said first biasing means downwardly into said extended relationship below the level of the corresponding peripheral portion of said main vehicle wheel means.

A preferred form of the invention also includes latching means for normally maintaining the brake means in wheel-locking relationship after said brake means has been actuated into said wheel-locking relationship by the downward movement of said small actuating wheel in response to encountering the boundary means, taking the form of a downwardly recessed groove means, whereby said main wheel will remain locked until released by the manual unlocking of said brake means by authorized market personnel. In a preferred form of the invention, said latching means comprises latching pawl means pivotally mounted within said hollow housing means and provided with effective pawl biasing means (usually spring means) normally biasing said latching pawl means toward the brake means, which is provided with a correspondingly positioned pawl-engaged detent means, with the latching pawl means and the pawl-engaging detent means being normally positioned out of cooperable or engageable relationship with respect to each other when the brake means is in said wheel-unlocking relationship, but being in cooperable engageable and latching relationship when said brake means is moved into said wheel-locking relationship as a consequence of sufficient actuation thereof by downward movement of said small actuating wheel means after encountering said downwardly grooved boundary means. In a preferred form, a manually operable means for unlatching said latching pawl means is provided and may comprise manual access means (such as a keyhole, or the like) providing access to the latching pawl means, and a latching pawl unlocking key means insertible through said access opening means into engagement with a movable portion of the latching pawl means for forcible disengaging movement against the latching pawl means whereby to separate and disengage it from the latching detent means of the brake means when the brake means is to be released from a previous wheel-locking relationship.

Also, in one preferred form of the invention, the actuating linkage means takes the form of an operating lever means having an input end effectively pivotally coupled with respect to an actuating or connecting member attached to a wheel mounting yoke or the like pivotally carrying the small actuating wheel means and also having an opposite output end of said operating lever effectively coupled with respect to an operating member, carried by said brake means, which is pivotally mounted in a manner such as to move a brake shoe means portion of the brake means into said wheel-locking relationship with respect to a main vehicle wheel wherein it effectively frictionally abuts a peripheral portion of such a main vehicle wheel for locking same, in response to said downward movement of said small actuating wheel means into said downward extreme wheel-locking position.

OBJECTS OF THE INVENTION

With the above points in mind, it is an object of the present invention to provide novel wheeled vehicle anti-theft apparatus comprising boundary-responsive wheel-locking means for a wheeled vehicle (such as a shopping cart or the like) for wheel-locking cooperation with respect to a specific type of boundary means defined around a desired permitted wheeled vehicle movement area, such as a market shopping area and/or adjacent motor vehicle parking lot area, or the like.

It is a further object of the present invention to provide novel apparatus of the character defined in the preceding object including means for maintaining the boundary-responsive wheel-locking apparatus in locked relationship, after once being initiated from normal unlocking relationship into locking relationship, until controllably released, unlocked, and re-set by authorized personnel.

It is a further object of the present invention to provide novel apparatus of the character referred to herein, generically and/or specifically, and which may include any or all of the features referred to herein, either individually or in combination, and which is of substantially foolproof construction suitable for use by a person knowing nothing whatsoever about the apparatus, and which is of relatively simple, relatively inexpensive, easy-to-manufacture, and easy-to-install construction suitable for ready mass production and distribution thereof, either in initially assembled and mounted relationship with respect to a wheeled vehicle (such as a shopping cart or the like), or suitable for easy attachment and mounting on a preexisting wheeled vehicle (such as a shopping cart or the like) at any time after its manufacture, with the manufacture and/or mounting thereof being such as to involve a relatively low cost, both as to initial capital cost (including production set-up cost) and also as to the subsequent per-unit manufacturing cost, whereby to be conducive to widespread production, distribution, and sale of the apparatus of the invention, either in a combined or separate, per se, form for the purposes outlined herein or for any substantially equivalent or similar purpose.

Further objects are implicit in the detailed description which follows hereinafter (which is to be considered as exemplary of, but not specifically limiting, the present invention), and said objects will be apparent to persons skilled in the art after a careful study of the detailed description which follows.

For the purpose of clarifying the nature of the present invention, one primary exemplary embodiment of the invention (and one fragmentarily shown exemplary manufacturing variation for producing a portion of same) are illustrated in the hereinbelow-described figures of the accompanying single drawing sheet, and are described in detail hereinafter.

BRIEF DESCRIPTION OF THE DRAWING

FIG. 1 is a fragmentary, partially broken-away view of one exemplary bottom leg portion and main supporting wheel portion of a wheeled vehicle of a type supported by multiple wheels and showing the conventional yoke-shaped main wheel mounting bracket carried at the bottom end of the broken-away, partially shown, exemplary leg portion of such a wheeled vehicle as being provided with the novel boundary-responsive wheel lock of the present invention in one exemplary form thereof.

FIG. 2 is a front elevational view of the apparatus of FIG. 1 illustrating the conventional main wheel of the wheeled vehicle, the rollable mounting thereof in the conventional yoke-shaped mounting bracket of the wheeled vehicle, the fragmentarily-shown bottom portion of the broken-away wheeled vehicle leg and clearly showing the novel boundary-responsive wheel lock of the present invention in fixedly attached mounted relationship with respect to the main wheel mounting bracket of the wheeled vehicle. This view also shows, in exploded relationship, one particular type of means for unlocking the wheel-locking means after it has been intitially activated into wheel-locking relationship in the manner clearly shown in FIG. 4.

FIG. 3 is a side view partly in section with respect to the housing means and partly in side elevation with respect to the apparatus and mechanism of the boundary-responsive wheel lock or wheel-locking apparatus contained within the hollow housing means. In this view all of the wheel lock apparatus is shown in the wheel-unlocking relationship with respect to the main vehicle wheel.

FIG. 4 is a fragmentary, partially broken-away view, also partially in section and partially in elevation, and is taken along the same plane as FIG. 3, but shows the various elements of the boundary-responsive wheel lock, or wheel-locking apparatus, in the other extreme position which comprises the wheel-locking relationship of the various elements thereof brought about by the relative downward movement of the small actuating wheel means below the level of the corresponding peripheral portion of the main vehicle wheel, made possible by the encountering of the downwardly grooved boundary means of the present invention such as is clearly shown in both FIG. 4 and FIG. 6.

FIG. 5 is a greatly reduced-size, three-dimensional isometric view illustrating an outside portion of a typical market and a typical parking area or area in which shopping carts are permitted, surrounded by one representative form of boundary means beyond which the movement of the carts is not permitted.

FIG. 6 is a greatly enlarged, cross-sectional view of the representative exemplary type of boundary means comprising a small recessed groove in the horizontal surface of the edge of the permitted area for shopping cart travel and of a size and shape such as to be suitable to allow the dropping downwardly of the small actuating wheel means from the normal wheel-unlocking position of FIG. 3 into the actuated wheel-locking position of FIG. 4 whenever the boundary means is encountered by the main shopping cart wheel and the small actuating wheel.

FIG. 7 is a fragmentary, greatly enlarged side sectional view of a portion of the periphery of the main vehicle wheel and the frictional surface means part of a brake shoe portion of the brake means shown in the engaged wheel-locking relationship thereof corresponding to the positions of the various parts of the invention when in wheel-locking relationship as shown in FIG. 4.

FIG. 8 is a fragmentary, partially broken-away view similar to the upper right-hand corner portion of the parts of the mechanism of the wheel lock lying within the housing means as shown in FIG. 4 after the latching pawl means has been moved by the unlocking key means of FIG. 2 into an unlatched relationship to allow the unlocking of the previously locked brake means from the brake-locking relationship shown in FIGS. 4 and 7 into the unlocked relationship shown in FIG. 3.

FIG. 9 is an enlarged, fragmentary, sectional view taken substantially along the plane and in the direction indicated by the arrows 9—9 of FIG. 1 and illustrates the exemplary constructional details of the locking fingers at the bottom of the housing means outer wall which lock it in place with respect to the bottom edge of the housing means inner wall in the exemplary representative mode of construction of the housing means illustrated in FIGS. 1 through 9 inclusive.

FIG. 10 is a greatly enlarged, fragmentary, detailed sectional view taken substantially along the plane and in the direction indicated by the arrows 10—10 of FIG. 3 and with the latching pawl and all portions behind the plane of the view removed for reasons of drawing simplification and clarity. This view is shown merely to illustrate one mode of manufacture of the rear wall member of the housing means, with a representative one of the four different outwardly projecting pivot pins being integrally formed on and fixedly carried by said inner wall portion of the housing means.

FIG. 11 is a view similar in aspect to FIG. 10, but merely illustrates a different mode of manufacture of each of the representative four pivot pins, in this case being struck out of the thin-sheet material of the blank forming the entire inner wall of the housing means, and is merely representative of one different mode of manufacture from that shown in FIG. 10, and it should be understood that neither FIG. 10 nor FIG. 11 is to be construed as limiting the invention to either specific mode of manufacture.

DESCRIPTION OF THE PREFERRED EMBODIMENTS

One ememplary boundary-responsive wheel lock, or wheel-locking apparatus, is indicated generally at 20 as being carried by a representative one of the legs of a main wheeled vehicle, such as the representative leg indicated generally in broken-away form at 22 in FIGS. 1 and 2 of a complete wheeled vehicle, such as is shown in greatly reduced form at 24, as best shown in FIG. 5. While the boundary-responsive wheel-locking apparatus 20 may be carried by any or all of the legs of such a shopping cart as that indicated at 24 in FIG. 5, it is quite effective when carried by only one of the shopping cart legs, which may, for example, comprise one of the rear legs thereof, although not specifically so limited.

In the exemplary type of shopping cart 24 illustrated, each of the legs 22 has attached to the bottom thereof a swivelled wheel mounting bracket of a yoke-shaped type, such as is generally designated by the reference numeral 26, which comprises a pair of transversely spaced bracket side wall portions 28 connected at the top by a substantially horizontally directed top edge wall member 30 which may be swivelly connected to the bottom of broken-away leg 22 for rotation around a vertical axis by swivel or caster type connector means which is shown exteriorly only, since such are wellknown in the art, as indicated at 32. Each of the transversely spaced pair of bracket side portions 28 extends downwardly similarly and between the two lower end portions rotatably mounts one of the plurality of main vehicle wheels, such as the one indicated diagrammatically at 34, which is mounted on effective pivot pin means 36 extending between transversely spaced lower parts of the two mounting bracket portions 28 for rotatably mounting the main wheel 34 for rotation around a horizontal axis 38 coincident with said pivot pin means 36 and longitudinally offset from a vertical axis of rotation, such as indicated at 40, of the vertical rotative mounting or swivel means 32. This of course provides the conventional swivelled, castered action of the entire conventional wheel mounting arrangement for mounting each such main wheel 34 of the main wheeled vehicle or shopping cart 24.

The novel boundary-responsive wheel-locking apparatus of the present invention, in the exemplary form thereof illustrated, comprises wheel-lock housing means, indicated generally at 42, having inner and outer transversely spacedly positioned wall means indicated at 44 and 46, respectively, effectively provided with and interconnected by edge means effectively including front edge means 48, top edge means 50, back edge means 52, and bottom edge means 54 whereby to define a hollow interior wheel-lock mounting chamber, such as is indicated generally at 56, within the hollow housing means 42.

The inner wall portion 44 of the housing means 42 is provided with an upwardly extending attachment member 58 which, in the example illustrated, is of triangular shape and which is rigidly attached to the corresponding outer wall portion 28 of the previously-mentioned yoke-type main wheel bracket 26, either at the time that the entire shopping cart is originally manufactured, or it can be attached thereto at any time subsequent to the manufacture of an entirely conventional shopping cart, thus making it possible to modify pre-existing shopping carts by attaching the attachment member 58 to one or more of the side portions 28 of one or more of the wheel yoke-type brackets 26 of such a shopping cart. In the example illustrated, the attachment of the attachment member to the bracket portion 28 is done after the rest of the complete wheel-locking unit has been fully assembled and is accomplished by merely placing one angular edge portion of the attachment member 58 inside of the corresponding angular edge of the corresponding side portion 28 of the main wheel mounting bracket 26, with aligned holes being provided therethrough, such as by drilling same, and with suitable mechanical fastener means being placed through the aligned holes and firmly fastened. In the example illustrated, two such mechanical fastener means are illustrated at 60 and may comprise rivets, nut and bolt threaded fasteners, or any other suitable type of fastener means providing a strong fixed attachment of the attachment member 58 and the entire wheel-locking apparatus 20 with respect to the corresponding main wheel braket 26.

In the example illustrated, the bottom edge means 54 of the housing means 42 is provided with a small actuating wheel opening 62 which has vertically slidably mounted therein a small actuating wheel 64 pivotally attached by pivot pin means 66 to a vertically movable actuating arm 68 comprising a portion of what might be termed actuating linkage means, the elements of which will be described in detail hereinafter.

The mounting of the small actuating wheel 64 and the actuating arm 68 is effectively within a small vertical slideway means so as to permit only vertical movement of a limited extent of both the small actuating wheel 64 and the actuating arm 68 connected thereto between two extreme vertical positions comprising a conventional main-wheel-unlocking upper position of said elements as best shown in FIG. 3 and a lower extreme position comprising a main-vehicle wheel-locking relationship or position thereof as is best shown in FIG. 4. When said small actuating wheel 64 and the connected actuating arm 68 are in their upper main-wheel-unlocking relationships as best shown in FIG. 3, a part of the periphery of the small actuating wheel 64 protrudes slightly downwardly through the opening 62 to an extent such as to be tangent to an underlying horizontal supporting surface, or ground plane, such as is indicated at 70, which is the same horizontal surface or ground plane which is also tangent to a bottom peripheral portion of the main vehicle wheel 34 so that both the main vehicle wheel 34 and the small actuating wheel 64 can simultaneously roll along the horizontal surface 70 when a shopping cart 24 is in normal usage. However, it should be noted that when the small actuating wheel 64 is moved downwardly into its lower extreme position, as best shown in FIG. 4, the bottom edge of the small actuating wheel 64 will lie below the level of the bottom edge of the periphery of the main wheel 34 and, thus, this can only occur when a small clearance space or recess is encountered by the small actuating wheel 64 as it rolls along the main horizontal supporting surface 70, with said small clearance space or recess being such as to allow the partial downward reception and movement thereinto of a portion of the small actuating wheel 64 while not allowing any corresponding downward movement of the main vehicle wheel 34. It is this condition which provides wheel-locking actuation of the apparatus in the manner shown in FIG. 4. In the exemplary form of the invention illustrated, this is made possible by the provision of boundary means around a permissible shopping cart movement area, as is illustrated in greatly reduced, small, diagrammatic form in FIG. 5 wherein one form of such boundary means is indicated generally at 72 and is shown as surrounding a shopping cart movement area, such as is indicated at 73, adjacent to a grocery store or market such as is indicated generally at 77. As shown in the enlarged cross-section of the exemplary boundary means 72 illustrated in FIG. 6 and also shown in FIG. 4, it comprises a downwardly recessed longitudinal groove means which, on each side, is flush with the remaining horizontal supporting surface 70, but which drops into a smooth curve to a lower maximum depth of the groove 74 as indicated at 76, thus defining a downwardly recessed groove such as that shown at 74, which is of an arcuate, cross-sectional nature of a size just slightly larger than the corresponding arcuate shape of a corresponding lower portion of the small actuating wheel 64 for the convenient reception thereof whereby to allow movement of the small actuating wheel 64 downwardly relative to the main vehicle wheel 34 in the manner best shown in FIG. 4 whenever a person attempts to wheel the shopping cart 24 across the boundary means 72. This will of course cause the immediate locking of the adjacent vehicle wheel means 34 in the manner shown in FIGS. 4 and 7 and render extremely difficult any further movement of the shopping cart 24 until the vehicle locking appartus 20 is unlocked by authorized market personnel in the manner shown in FIG. 8, which will be described hereinafter.

In the exemplary form illustrated, the width of the downwardly recessed groove 74 may be approximately three-fourths of an inch and the depth thereof may be approximately three-eighths of an inch, with the corresponding portions of the lower half of the small actuating wheel 62 being similar, although somewhat lesser in magnitude. Thus it will be seen that the downwardly recessed groove 74 defining the exemplary type boundary means 72 will be of such small proportions as to be no safety hazard or to not substantially interfere in any way with the normal usage of both the shopping cart permitted area 73 and exterior adjacent areas for all purposes other than attempting to wheel a shopping cart outwardly across the boundary means 72, which is unauthorized and which it is the purpose of the present invention to prevent. Of course, the shape of the groove 74 may be modified, although the form thereof illustrated has been found to be advantageous.

In the exemplary form illustrated, the wheel-locking apparatus 20 also includes brake means indicated generally at 78 movably mounted with respect to the housing means 42 for movement between two extreme positions, one of which is shown in FIG. 3 and the other of which is shown in FIG. 4, with one of said positions comprising a wheel-unlocking relationship or position and with the other of said positions comprising a wheel-locking relationship or position thereof. In the exempiary form illustrated, the brake means 78 includes a brake shoe portion 80 having an effective frictional surface means 82 extending transversely and in a position such as to face a peripheral portion of the main vehicle wheel 34 at a position somewhat above the level of the supporting surface 70 for movement either toward or away from said peripheral portion of the main wheel 34 between the wheel-unlocking position thereof as shown in FIG. 3 and the wheel-unlocking position thereof as shown in FIG. 4 and further illustrated in enlarged, fragmentary, sectional detail in FIG. 7. The brake means 78 also includes a brake-shoe operating member 84 which extends inwardly from the brake-shoe portion 80 and which is pivotally mounted by brake-shoe pivot pin means 86 at a fixed location with respect to the inner housing wall 44 and has an extended lever-engagement portion 88 which engages an output end 90 of an operating lever member, indicated generally at 92, which is also pivotally mounted by a lever pivot pin 94 similar to the brake pivot pin 86 and with said operating lever 92 having an input end 96 movably coupled to the previously-mentioned actuating arm 68 carrying the small actuating wheel 64 at the bottom end thereof. All of the parts just described — that is, the brake shoe operating arm 84, the extended portion 88 thereof, the complete operating lever 92, and the actuating arm 68 comprise what might be termed actuating linkage means effectively linking the vertical operation of the small actuating wheel 64 between the two extreme positions of FIGS. 3 and 4 to the brake means 78 whereby to normally allow the brake shoe 80 to be spaced away from and out of engagement with the periphery of the main wheel 34 when all of the apparatus and, in particular, the small actuating wheel 64 are in the positions shown in FIG. 3, and yet will cause movement of the brake shoe 80 into positive wheel-locking engagement with a corresponding peripheral portion of the main vehicle wheel 34 whenever all of said elements and, in particular, the small actuating wheel 64, are in the other extreme positions thereof as shown in FIG. 4.

The normal wheel-unlocking relationship of all of the just-described parts, as shown in FIG. 3, are maintained only because of the upward force exerted by the horizontal ground surface 70 against the bottom of the small actuating wheel 64 which is effectively biased toward the lower extreme, downwardly extended, wheel-locking relationship thereof as shown in FIG. 4 by actuating wheel-biasing means which, in the example illustrated, takes the form of spring means, indicated generally at 98, having one end mounted in a mounting member within the housing means as indicated at 100 and having the other end, as indicated at 102, mounted in downwardly biasing relationship against the upper end of the previously mentioned actuating arm 68 vertically slidably carrying the small actuating wheel 64. A second biasing means (also, in the preferred form illustrated, comprising a spring means) is indicated generally at 104 and comprises a brake spring exerting an effectively lesser biasing force on the previously-mentioned projecting portion 88 of the brake operating member 84 in a direction such as to cause the brake shoe 80 to be in the disengaged wheel-unlocking relationship shown in FIG. 3 whenever the small actuating wheel 64 is forcibly maintained in the upper position shown in FIG. 3 by being in contact with the underlying supporting surface 70. However, just as soon as the small actuating wheel 62 rolls across the downwardly recessed groove 74 defining the boundary means 72 and the actuating wheel biasing spring means 98 moves it downwardly into the position shown in FIG. 4, the output end 90 of the operating lever 92 will move the brake means 78, against the action of the lesser force exerted by the just-mentioned brake biasing spring 104, into the wheel-locking relationship shown in FIGS. 4 and 7.

The wheel-locking apparatus 20 is also provided with latching means for maintaining the wheel-locking relationship of the apparatus, once it has been actuated by the dropping down of the small actuating wheel 64, until the apparatus is unlocked and re-set by authorized personnel. In the example illustrated, the latching means takes the form of latching pawl means 106 pivotally mounted on a pivot pin 108 similar in nature to the other two previously mentioned pins 86 and 94 and with the latching pawl 106 being biased by a pawl biasing spring means 110 toward the brake means 78, which has no effect thereon as long as the apparatus is in the unlocked relationship illustrated in FIG. 3. However, since the movably mounted brake means 78 is provided with a pawl-engaging detent means 112, which is not engaged with respect to the latching pawl 106 when the apparatus is in the unlocked relationship shown in FIG. 3, the wheel-locking actuation of all of the movable elements into the relationship shown in FIG. 4 moves the detent means 112 into a position such that the pawl biasing spring 110 will immediately pivotally move the latching pawl means 106 into the latched relationship with respect to the brake means 78 clearly shown in FIG. 4. This will thereafter hold the brake means 78 in engagement with the periphery of the main wheel 34 as shown in FIG. 4 and FIG. 7 whereby to immobilize said main wheel 34 until such time as the apparatus is unlocked and re-set by authorized personnel in the manner shown in FIG. 8.

The unlocking, unlatching, and re-setting of the apparatus just referred to is made possible by the provision of manual access means for providing access to the latching pawl means. In the example illustrated, this comprises a keyhole 114 in the outer cover plate or wall portion 46 of the housing means 42 which is so positioned adjacent to the lower side of the latching pawl means 106 so as to allow the manual insertion thereinto of an unlocking key means, such as is indicated at 116, so that the projecting portion 118 of the key 116 can be rotated against the underneath side of the free movable end of the latching pawl means 106 so as to move it forcibly against the action of the pawl biasing spring 110 out of the detent means 112, as is clearly shown in FIG. 8. As soon as this is done, the movable brake means 78 is free to move in response to the force exerted by the brake-biasing spring 104 back into the unlocked relationship shown in FIG. 3 provided that the small actuating wheel 64 is again in the upper extreme position of FIG. 3.

While the apparatus may be assembled in any convenient manner, one particular construction and mode of assembly which has been found desirable is to first mount all of the movable parts on the various pivot pins and other mounting structures carried by the inside surface of the inner wall portion 44 of the housing means 42 prior to engaging the outer wall portion 46 therewith. After the movable-part mounting operation just mentioned has been completed, then the outer wall portion may be mounted over the movable parts and fixed in such relationship with respect to the inner wall portion 44. In the example illustrated, this is made possible by the provision of an inwardly projecting fastening teat 120 at the top of the outer wall portion, which is adapted to be passed inwardly through a corresponding slot 122 in the inner wall member 44 immediately above the complete housing means 42 when fully assembled and then to be folded-over to comprise a retaining tab, as best shown in FIG. 2, and also indicated by the reference numeral 120. In the exemplary form illustrated, there are two similar retaining tabs at the locations indicated at 124 carried by the bottom of the outer wall portion 46 adapted to be similarly formed inwardly and to be engaged in locking relationship with respect to the rear wall portion 44 in a positive retaining manner, as is best shown with respect to an exemplary one of the the two such retaining structures just described, shown in fragmentary enlarged sectional detail in FIG. 9. This provides an easy-to-assemble and yet strong, positively-closed housing structure of a relatively simple, inexpensive type.

After assembly of the housing means 42 as just described, the attachment member 58 may be attached to the wheel-mounting bracket portion 28 as previously described.

It should be noted that each of the pivot pins 86, 94, and 108 just described may be formed in a manner generally similar to the enlarged, fragmentary, sectional showing of FIG. 10, which indicates a forming of the material with a provision of excess material at the location of the pivot pin. This type of forming operation, as illustrated in FIG. 10, does not disturb the remainder of the side wall 44 of the housing means, but merely forms the representative pin 108 so as to be integral therewith. Conversely, another type of forming operation, as illustrated in FIG. 11, wherein similar parts are indicated by similar reference numerals, primed, however, may be of a type wherein an initial blank is provided and is subsequently formed by striking or deforming the blank, and since there is no excess material at the location of the formed effective pivot pin 108', it will normally be found that when it is formed out of the blank forming the side wall portion 44', it will assume an appearance of a type generally such as that shown in FIG. 11. Either type of forming operation or any other substantial equivalent may be employed in lieu of the two specific arrangements just previously briefly described. It should also be noted that the various pivot pins and spring mounting structures need not be formed on the inner wall portion 44 of the housing means 42, but instead may be formed on the inside surface of the outer wall means 46 thereof or various combinations of either or both of such arrangements may be employed. Indeed, any constructional means which will mount the proper parts in the proper relationships may be employed in lieu of the specific arrangements illustrated in the drawings and described hereinbefore. Also, said parts may be formed of metal, plastic, or fabricated of any suitable material (or materials).

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent construction embodying the basic teachings and inventive concept of the present invention.

What is claimed is:

1. Boundary-responsive wheel lock for a wheeled vehicle provided with and rollably supported by multiple wheels, at least one of which is provided with said boundary-responsive wheel lock, comprising: wheel-lock housing means defining a hollow interior wheel-lock mounting chamber therein and provided with a rigidly connected attachment member and fastener means cooperable for rigidly fastening said attachment member to a main wheel mounting bracket carried by a leg of said wheeled vehicle, said housing means being provided with a vertically slidably mounted, small actuating wheel connected to an actuating arm which is vertically slidably carried by and positioned within the hollow interior wheel-lock-mounting chamber within said housing means, with said actuating wheel being positioned vertically adjacent to and aligned with a bottom-positioned actuating wheel opening in said housing means for vertical movement of said small actuating wheel from a normal upper position protruding slightly downwardly through said opening for rollable contact with an underlying supporting surface during simultaneous rollable contact of main wheels of said wheeled vehicle along such a supporting surface while rolling simultaneously therewith and for downward vertical movement through said opening into a downwardly extended wheel-locking position whenever sufficient downward clearance is encountered by said small actuating wheel below the level of the bottom edge of the corresponding main wheels of such a wheeled vehicle; brake means movably mounted with respect to the hollow interior of said housing means for movement between two extreme positions, one comprising a wheel-unlocking position with respect to and spaced from the corresponding periphery of at least one of the main wheels of such a wheeled vehicle and a second extreme wheel-locking position in locking engagement with a peripheral portion of at least one main wheel of such a wheeled vehicle; and brake-operating linkage means positioned within said hollow housing means and having an input end effectively connected with respect to said actuating arm carrying said small actuating wheel and having an output end effectively connected with respect to said brake means in a manner normally moving said brake means from said wheel-unlocking position into said wheel-locking position in response to said movement of said small actuating wheel from said normal upper position into said downwardly extended wheel-locking position; latching means movably mounted within said hollow housing means and provided with effective biasing means normally biasing said latching means into latching relationship with respect to said brake means whenever said brake means is in said wheel-locking relationship; and latching means unlocking key means controllably manually engageable with respect to said latching means for forcibly disengaging same with respect to said brake means when said brake means is to be effectively released and caused to move from said wheel-locking relationship to said wheel-unlocking relationship thereof.

2. Apparatus as defined in claim 1, including actuating wheel biasing means positioned within said hollow housing means and mounted in a manner effectively applying positive downward biasing force to said small actuating wheel for normally biasing it toward fully downwardly extended, main-wheel-locking relationship.

3. Apparatus as defined in claim 2, including brake means biasing means mounted within said hollow housing means and effectively resiliently abutting said brake means in a manner normally biasing it toward said wheel-unlocking relationship but with a lesser force than the biasing of said small actuating wheel means toward said wheel-locking relationship by said actuating wheel biasing means.

4. Apparatus as defined in claim 1, wherein said brake means comprises a brake shoe portion having an effectively frictional surface means facing a peripheral main wheel portion for wheel-locking engagement therewith and for wheel-unlocking disengagement therewith and further includes a brake-shoe-operating member pivotally movably positioned within the hollow interior chamber of said housing means.

5. Apparatus as defined in claim 4, wherein said brake-operating linkage means comprises an operating lever member pivotally mounted within said housing means and relative to a fixed-pivot-point location and positioned in a non-translatory manner with respect to a side wall portion of said housing means, said operating lever means having an input end effectively pivotally coupled with respect to an upper portion of said actuating arm attached to and extending vertically upwardly from said small actuating wheel, an opposite end of said operating lever means effectively comprising an output end effectively coupled with respect to said operating member of said brake means in a manner such that downward movement of said small actuating wheel means will operate said input end of said operating lever means and will correspondingly operate said output end of said operating lever means, which will correspondingly move said operating member of said brake means in a manner such as to move said brake shoe portion into said wheel-locking position effectively frictionally abutting a peripheral portion of said main wheel of said wheeled vehicle for locking same in response to said downward movement of said small actuating wheel into said downward extreme wheel-locking position.

6. Apparatus as defined in claim 5, including latching pawl means pivotally mounted within said hollow housing means and provided with effective pawl biasing spring means normally biasing said latching pawl toward a brake-means-latching relationship with respect to said brake means whenever it is in said wheel-locking relationship, said movably mounted brake means being provided with a pawl-engaging detent means normally positioned out of the range of engaging and latching movement of said latching pawl means when said brake means is in said wheel-unlocking relationship but movable into latching pawl receiving and engaging position whenever said brake means is moved into said wheel-locking relationship.

7. Apparatus as defined in claim 6, including latching-pawl-unlocking key means and further including key-receiving opening means carried by said housing means adapted to receive said latching-pawl-unlocking key means for positioning same in engagement with a movable portion of said latching pawl means for forcible movement of said latching-pawl-unlocking key means and for consequent forcible disengaging of said latching pawl means from said pawl-engaging detent means of said brake means when said brake means is to be released from said wheel-locking relationship and is to be effectively moved into said wheel-unlocking relationship thereof.

8. Apparatus as defined in claim 7, including actuating wheel biasing means positioned within said hollow housing means and mounted in a manner effectively applying positive downward biasing force to said small actuating wheel for normally biasing it toward fully downwardly extended, main-wheel-locking relationship; and brake means biasing means mounted within said hollow housing means and effectively resiliently abutting said brake means in a manner normally biasing it toward said wheel-unlocking relationship but with a lesser force than the biasing of said small actuating wheel means toward said wheel-locking relationship by said actuating wheel biasing means.

* * * * *